United States Patent [19]
Dietrich

[11] Patent Number: 6,145,938
[45] Date of Patent: Nov. 14, 2000

[54] CYCLE, TENSIONED SPOKED WHEEL ASSEMBLY AND HUB THEREFOR

[76] Inventor: Rolf Dietrich, 4631 Shadowood La., Toledo, Ohio 43614

[21] Appl. No.: 09/374,771

[22] Filed: Aug. 16, 1999

Related U.S. Application Data

[63] Continuation-in-part of application No. 08/730,479, Oct. 11, 1996, Pat. No. 5,938,293.

[51] Int. Cl.$^7$ .................................................. B60B 1/14
[52] U.S. Cl. .......................................... 301/59; 301/110.5
[58] Field of Search .................................. 301/54, 55, 56, 301/59, 104, 110.5

[56] References Cited

U.S. PATENT DOCUMENTS

| | | | |
|---|---|---|---|
| 514,965 | 2/1894 | Rucker et al. | 301/56 |
| 614,284 | 11/1898 | Barnett | 301/56 |
| 1,910,164 | 5/1933 | Horn | 301/54 |
| 5,445,439 | 8/1995 | Dietrich . | |
| 5,487,592 | 1/1996 | Rasmussen . | |

FOREIGN PATENT DOCUMENTS

| 13973 | of 1896 | United Kingdom | 301/55 |
|---|---|---|---|

OTHER PUBLICATIONS

Literature from Campagnolo S.r.l. of Vicenza, Italy Examples of Wheels Identified by the Following Trade Designations: "Bora" "Shamal" "Electron" "Proton" "Nucleon Code R–NU200" and "Nucleon Code R–NU400".

*Primary Examiner*—Russell D. Stormer
*Attorney, Agent, or Firm*—John C. Purdue; David C. Purdue

[57] ABSTRACT

Improvements in torque transmitting wheels are disclosed. The improvements afford more balanced torque transmission as between the proximal spokes, adjacent to a torque transmitting member, such as a sprocket, sprocket cluster or disc for a brake, and the distal spokes which are opposite from the torque transmitting member. A wheel according to the present invention is provided with radially oriented proximal spokes and tangentially oriented distal spokes. This shifts the majority of the torque transmission task to the distal spokes which, in a torque transmitting wheel, are under less tension than proximal spokes under static conditions. A torque transmitting member is mounted on the hub, adjacent the proximal hub flange, and the distance from the proximal hub flange to a plane through the proximal edge of the rim is substantially less than the corresponding distance from the distal hub flange. The torque transmitting member is mounted so that, when it is rotated in a first direction, the rotation is always transmitted to the hub. A plurality of the spoke members radially connect the rim to the proximal hub flange while a second plurality thereof tangentially connect the rim to the distal hub flange so that more of any torque applied to the torque transmitting member is transmitted through the tangentially oriented, distal spoke members than through the radially oriented, proximate spokes.

9 Claims, 8 Drawing Sheets

CYCLE, TENSIONED SPOKED WHEEL ASSEMBLY AND HUB THEREFOR

REFERENCE TO RELATED APPLICATION

This is a continuation in part of application Ser. No. 08/730,479, filed, Oct. 11, 1996, now U.S. Pat. No. 5,938,293.

BACKGROUND OF THE INVENTION

1. Field of the Invention

The present invention relates generally to bicycles and spoked wheels therefor. More specifically, the invention relates to rear tensioned spoked bicycle wheels and hubs designed to have improved and better balanced torque transmission capacity.

2. Description of the Prior Art

Rear bicycle wheels are known as are multi-speed bicycles with rear wheel hubs including a multiplicity of sprockets. In a conventional rear bicycle wheel, with a plurality of sprockets, torque is transmitted through the sprocket to the wheel hub and through flanges on the hub to spokes and through those spokes to the rim. The spokes extend tangentially, relative to the hub flanges, between the hub flanges and the rim. However, under static conditions, the tension in the spokes connected to the hub flange adjacent to the sprockets, hereinafter referred to as the proximal spokes and proximal hub flange, respectively, is substantially greater than the tension in the spokes connected to the hub flange opposite the proximal hub flange, hereinafter referred to as the distal spokes and the distal hub flange, respectively. This disproportionate tension is a consequence of the geometry of such rear wheels. The center plane (CP shown in FIG. 2) of the rim and of the rear wheel intersects the hub between the proximal and distal hub flanges at a point which is much closer to the proximal hub flange than it is to the distal hub flange. In order to achieve this geometry, the lateral forces exerted by the distal spokes on the rim must equal the lateral forces exerted by the proximal spokes on the rim. Since the proximal spokes are more nearly perpendicular to the axis (A shown in FIG. 2) of the hub than are the distal spokes, the proximal spokes must be under more tension in order to offset the lateral forces exerted by the distal spokes on the rim.

Under dynamic conditions, and especially when torque is being transmitted through the hub to the rim, a grossly disproportionate percentage of the torque is transmitted through the proximal spokes to the rim. This phenomenon is a consequence of the flexibility of the hub shaft (designated 13 in FIG. 2) and the greater tension of the proximal spokes, as mentioned above, whereby under static conditions they are stretched closer to their elastic limit which must be approximated before the spokes can transmit torque to the rim. In conventional rear hubs with multiple sprockets, torque is transmitted from the sprockets to the hub at a point or points located generally between the proximal hub flange spokes and the sprockets. Most of the torque applied to a hub having equally sized flanges or to a hub with a larger proximal hub flange is transmitted through the proximal hub flange because the hub shaft (13 shown in FIG. 2) flexibility prevents the torque from reaching the distal hub flange before the proximal spokes achieve their elastic limit, the point at which they begin to transmit torque and because the mechanical displacement, the stretch, of the distal spoke must be greater to get to their elastic limit to compensate for their lower static tension. The torque loss is a function, among other things, of the stiffness of the hub and the distance between the point where torque is applied to the hub and the flange through which the torque is transmitted. In other words, more torque is transmitted to the proximal hub flange than is transmitted to the distal hub flange. Consequently, torque transmission through the hub exacerbates the disproportionate spoke tension which exists under static conditions in conventional rear wheels causing undue and unnecessary strain on the proximal spokes, far in excess of the strain on the distal spokes.

In recognition of the minor contribution of distal spokes in rear wheel torque transmission, Campagnolo, in a wheel having equally sized hub flanges, orients the distal spokes radially so that they transmit virtually no torque to the rim. Virtually all of the torque is transmitted through the proximal spokes. It is hard to imagine a construction which would cause more strain on the proximal spokes. Another bicycle company offers a rear bicycle wheel hub having a proximal hub flange which is substantially larger than the distal hub flange. In virtually every other rear wheel produced by the industry today, there is a hub with equally sized hub flanges. None of these constructions enables the distal spokes to contribute significantly to the transmission of torque from the hub to the rim and tire.

It should be recognized that only half of the tangentially oriented proximal spokes are positioned to transmit driving torque from the proximal hub flange to the rim. The other half are oriented so that they can not transmit torque. As a consequence, one half of the proximal spokes, i.e., one fourth of the total spokes in the rear wheel, wind up transmitting virtually all of the torque to the rim. Since these spokes, under static conditions, are under significantly more tension that the distal spokes, it is easy to understand why nearly one hundred percent of rear wheel spoke breakage occurs in the driving proximal spokes. This characteristic of conventional rear wheels has also thwarted efforts at reducing the spoke count in rear bicycle wheels.

SUMMARY OF THE INVENTION

The present invention is based upon the discovery of an improved rear bicycle wheel which exhibits more balanced torque transmission as between the proximal and distal spokes. In one embodiment, torque balancing is achieved by providing the hub with a distal hub flange which has a diameter which is substantially larger than the proximal hub flange. Excellent results have been achieved in a wheel with a hub having a proximal hub flange with a diameter of X and a distal hub flange with a diameter of approximately 1.5 X. Such a wheel, having twelve spokes, has been produced and tested on a bicycle and, with a two-hundred pound rider standing on one of the bicycle pedals, it was determined that substantially more torque was transmitted through the distal spokes than would be transmitted through them if they were in a wheel which had distal and proximal hub flanges of the same diameter but was otherwise identical. It is preferred that the diameter of the distal hub flange be at least 1.1 times the diameter of the proximal hub flange and, more preferably, 1.2 times.

In another embodiment, a wheel according to the present invention is provided with radially oriented proximal spokes and tangentially oriented distal spokes. This shifts the majority of the torque transmission task to the distal spokes which, as noted above, are under less tension than proximal spokes under static conditions. In yet another embodiment, a wheel according to the invention includes a novel hub in which torque is transmitted to the hub at a point between the distal and proximal hub flanges, but closer to the distal hub flanges.

Accordingly, it is an object of the present invention to provide a rear wheel including a hub assembly which, under dynamic conditions, transmits substantially more torque through the distal spokes and correspondingly less torque through the proximal spokes, by comparison with rear wheels having conventional hubs.

It is a further object of the present invention to provide a rear hub design which enables the construction of rear bicycle wheels with drastically low spoke counts, including a twelve spoke rear wheel which has already survived hundreds of miles under a two-hundred pound rider.

These and other objects and advantages of the present invention will no doubt become apparent to those skilled in the art after having read this detailed description of the invention including the following description of the preferred embodiment which is illustrated by the various drawing figures.

DETAILED DESCRIPTION OF THE PREFERRED EMBODIMENTS

Figure 1:
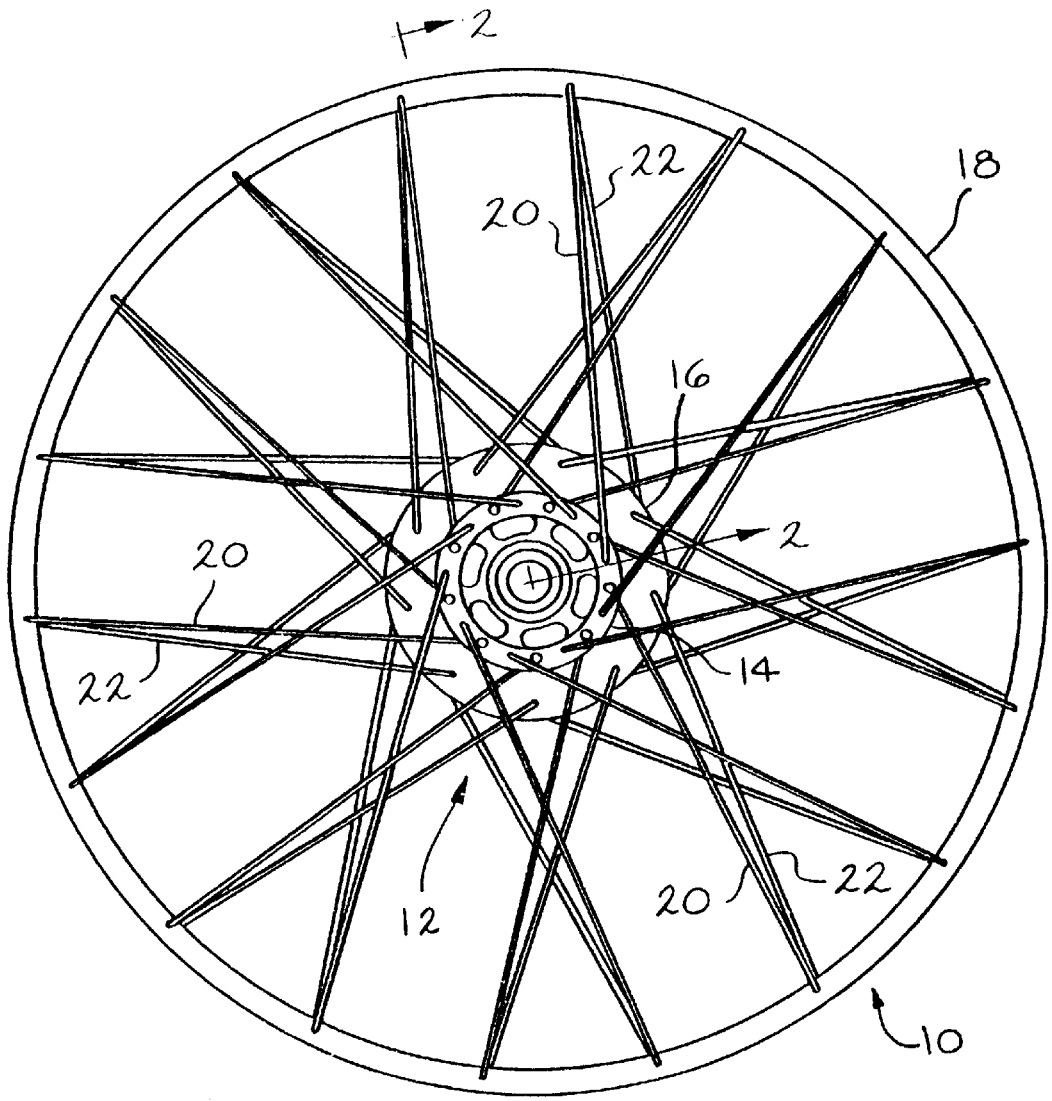
FIG. 1 is a side view of a 36 spoke, tangentially spoked wheel according to the present invention.
Figure 2:
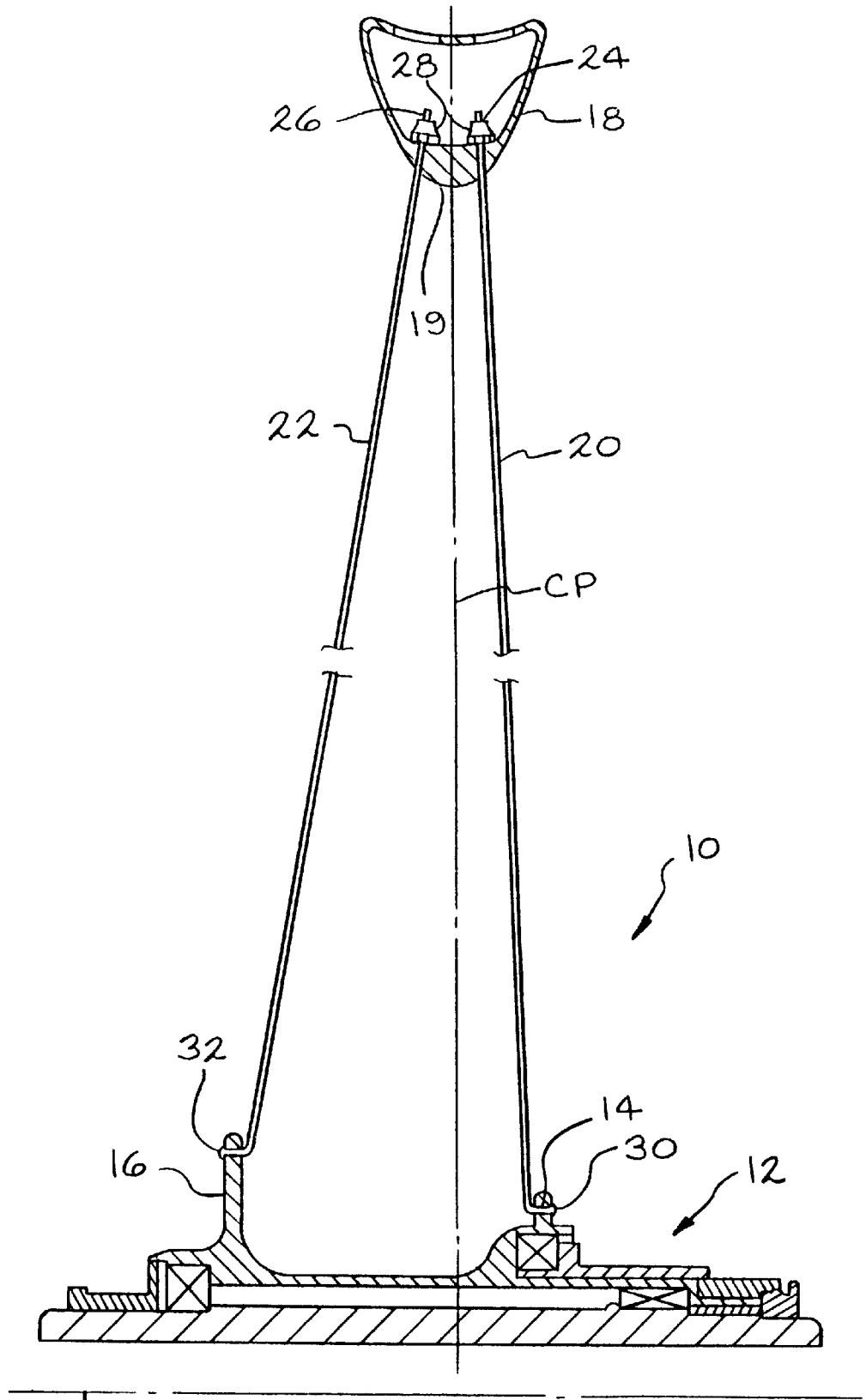
FIG. 2 is a cross sectional view of the wheel shown in FIG. 1, taken along the line 2—2 of FIG. 1.

Referring to FIGS. 1 and 2, a thirty six spoke rear wheel according to the present invention is indicated generally at 10. The wheel 10 comprises a hub 12 with a hub shaft 13 and first and second opposed hub flanges 14 and 16. Except for the flanges 14 and 16, the hub 12 can be a conventional, multi-sprocket rear hub. The first hub flange 14 will be referred to as the proximal hub flange, meaning, as noted above, that it is adjacent to the sprockets. The second hub flange 16 will be referred to as the distal hub flange, meaning that it is located at the opposite end of the hub from the sprockets. The proximal hub flange 14 has a substantially smaller diameter than the distal hub flange 16. Favorable results, described below in more detail, have been obtained in the testing of a rear wheel having twelve spokes and a distal hub flange having a diameter of about 68 millimeters ("mm") and a proximal hub flange having a diameter of about 48 mm.

The wheel 10 has a rim 18 and, in the embodiments illustrated in FIGS. 1 and 2, the rim 18 is an extruded rim with a thickened bottom portion 19. Alternatively, the rim 18 can have a fairly uniform cross sectional thickness and an insert (not shown) may be used to take the place of the thickened portion 19. The rim 18 is laced to the hub 12 with eighteen pairs of first spokes 20 and second spokes 22. The first spokes 20 will be referred to as proximal spokes and the second spokes 22 will be referred to as distal spokes. The proximal spokes 20 are approximately 10 mm longer than the distal spokes 22. Referring now to FIG. 2, an outer end 24 of a proximal spoke 20 is paired, at the rim, with an outer end 26 of a distal spoke 22. This paired spoking and its advantages are thoroughly discussed in applicant's U.S. Pat. No. 5,445,439, the disclosure of which is incorporated herein by reference. The ends 24 and 26 are secured to the rim 18 by nipples 28 which are internally threaded. The proximal and distal spokes 20 and 22 have headed inner ends 30 and 32 which are connected to the hub flanges 14 and 16, respectively.

Figure 3:
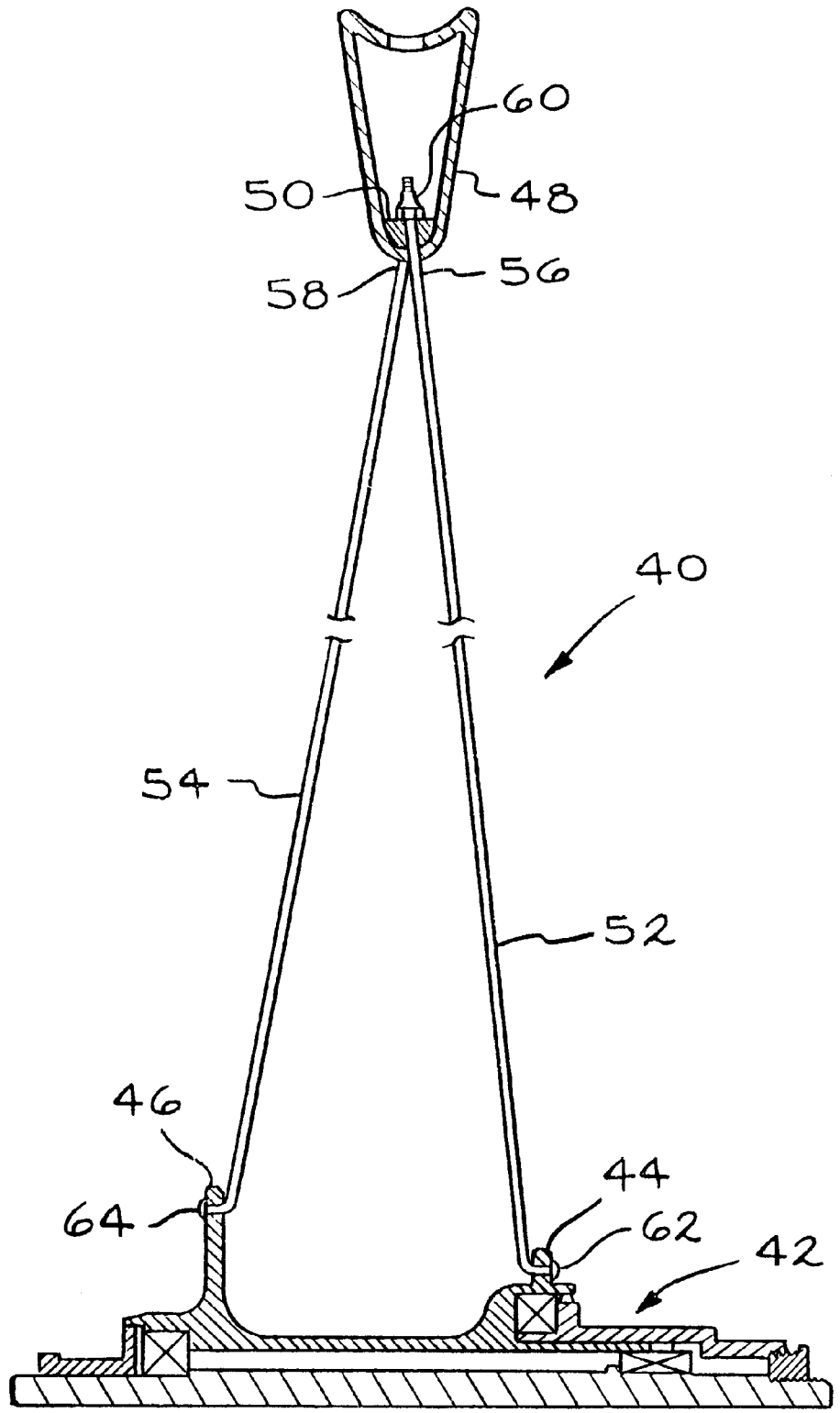
FIG. 3 is a representation of a cross sectional view of a wheel which is similar to the wheel shown in FIG. 2, but includes a carbon fiber composite rim and has modified spoke connections thereto.

Referring now to FIG. 3, a carbon fiber composite rim embodiment of the wheel 10 is indicated generally at 40. The wheel 40 comprises a hub 42 with a proximal hub flange 44 and a distal hub flange 46. The hub 42 corresponds with the hub 12 described above with reference to FIGS. 1 and 2. The proximal hub flange 44 has a substantially smaller diameter than the distal hub flange 46. The hub 40, like the hub 14, include free wheel mechanisms positioned immediately adjacent to the proximal hub flanges 14 and 44 in contrast to the hub described below with reference to FIG. 6.

The wheel 40 has a carbon fiber composite rim 48 with a fairly uniform cross sectional thickness and a metal insert 50, which extends around the rim 48. The rim 48 corresponds generally with commercially available rims offered by Zipp wheel company although differing in the positioning of the spoke holes and including carbon fiber reinforcements around the spoke holes. The rim 48 is laced to the hub 42 with pairs of distal spokes 52 and proximal spokes 54. The proximal spokes 52 are approximately 10 mm longer than the distal spokes 54. An outer end 56 of a proximal spoke 52 is paired, at the rim, with an outer end 58 of a distal spoke 54. The proximal spoke end 56 is spaced approximately one half inch from the distal spoke end 58. This type of paired spoking and its advantages are thoroughly discussed in applicant's copending U.S. patent application Ser. No. 08/520,536 filed Aug. 28, 1995, the disclosure of which is incorporated herein by reference. The ends 56 and 58 are secured to the rim 48 by nipples 60 which are internally threaded. The proximal and distal spokes 52 and 54 have headed inner ends 62 and 64 which are connected to the hub flanges 44 and 46, respectively.

A rear multi-sprocket wheel corresponding with the wheel 40 has been built and tested. The wheel was built with 12 spokes, six proximal spokes and six distal spokes in pairs which were spaced evenly around the rim 48 and the hub 42. The rear wheel had a distal hub flange with a diameter of about 68 mm and a proximal hub flange having a diameter of about 48 mm. The wheel was built, trued and mounted on a bicycle. The spokes were "snapped" or plucked to provide an auditory measure of their tightness or tension. This was done for a plurality of distal spokes and a plurality of proximal spokes and average values were used. Under static conditions, the vibration of the proximal spokes produced a tone having a first, given, undetermined frequency and the vibration of the distal spokes produced a tone having a second, given undetermined frequency. The simulate dynamic conditions with torque applied through the hub, a two-hundred pound rider stood on the pedal of the bicycle and the spokes were again snapped, although care was taken to not snap a spoke which was connected to the rim near the road contact point because the load of a rider unloads, to some extent, such a spoke. Under these conditions, the vibration of the proximal spokes produced a tone having a third, given, undetermined frequency and the vibration of the distal spokes produced a tone having a fourth, given undetermined frequency. The first tone was higher than the second tone by a substantial measure. The third tone was higher than the fourth tone but this difference was significantly less than the difference between the first and second tones. In other words, the flange size differential caused more of the driving torque to be transmitted through the distal spokes than through the proximal spokes. This demonstrates that the differential flange sizes in the hub are effective at distributing driving torque primarily through the distal spokes so that the application of driving torque lessens rather than increases the tension differential that exists between the distal and proximal spokes.

Figure 4:
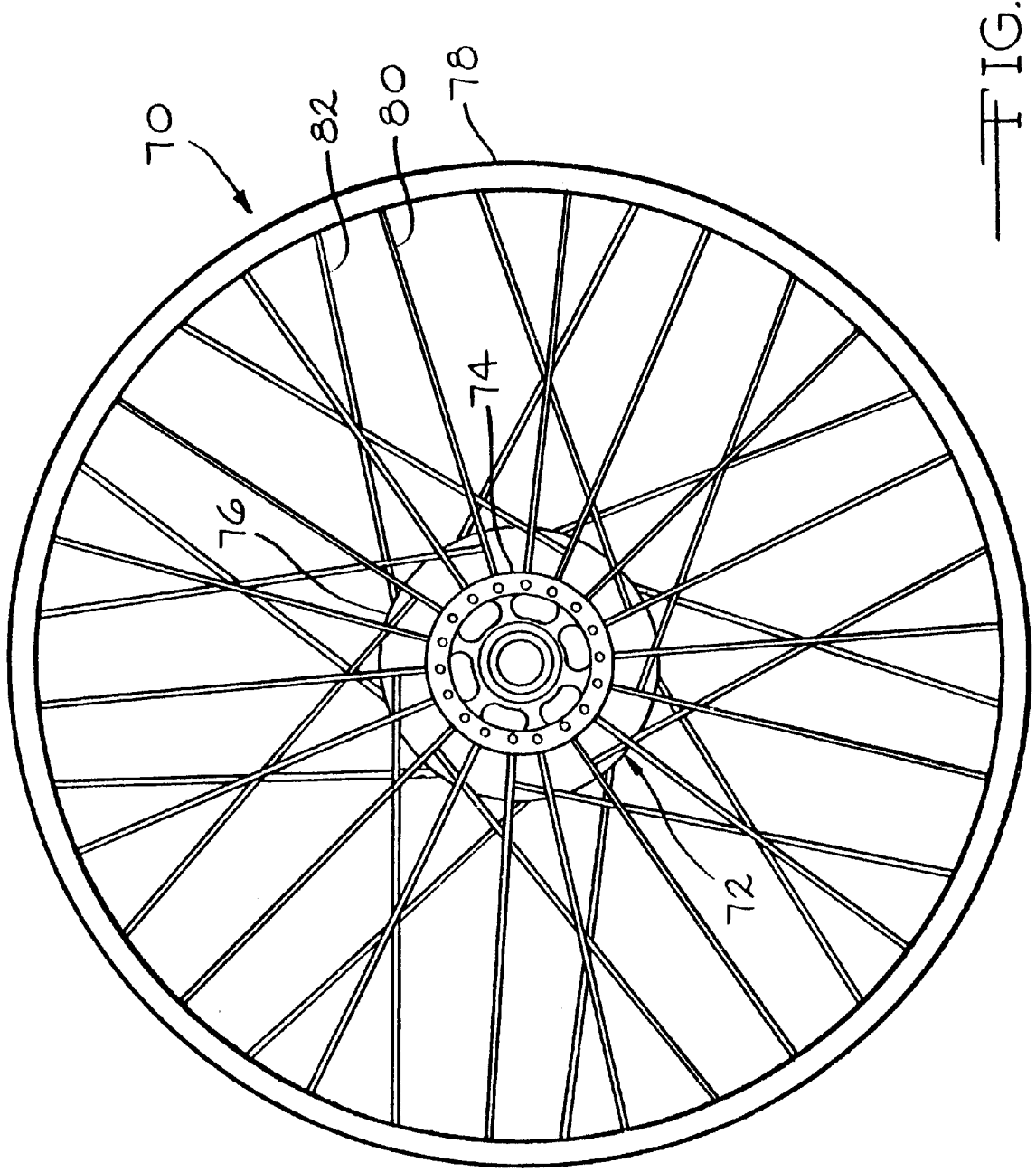
FIG. 4 is a side view of a wheel according to a second embodiment of the present invention and includes proximal spokes arranged radially and distal spokes arranged tangentially.

Referring now to FIG. 4, a thirty six spoke rear wheel according to a second embodiment of the present invention is indicated generally at 70. The wheel 70 comprises a hub 72 with a proximal hub flange 74 and a distal hub flange 76. Except for the flanges 74 and 76, the hub 72 is a conventional, multi-sprocket rear hub although, as discussed below, this embodiment, in which the spoke lacing pattern is critical, can be applied to wheels having hubs with like sized proximal and distal hub flanges. This hub must have sufficient rigidity to transmit forces between the hubs without appreciable deformation.

The wheel 70 has a rim 78 and, in the embodiment illustrated in FIG. 4, the rim 78 is an extruded rim corresponding generally with the rim 18 shown in FIGS. 1 and 2. It will be appreciated that the spoke lacing pattern of this embodiment of the invention can be applied to wheels having virtually any kind of rim including a carbon fiber composite rim such as the one described above with reference to FIG. 3. The rim 78 is laced to the hub 72 with eighteen pairs of proximal spokes 80 and distal spokes 82. The proximal spokes 80 are oriented radially so that they are virtually ineffective to transmit torque to the rim 78. The distal spokes 82 are oriented tangentially so that half of the distal spokes are operable to transmit torque to the rim. As noted above, under static conditions, the distal spokes are not as tight as the proximal spokes and the proximal spokes are significantly tighter than the distal spokes. By preventing the proximal spokes from transmitting torque and enduring the additional tensile stresses associated with torque transmission, the lacing pattern of this embodiment forces the distal spokes to carry the additional tensile stresses which arise when torque is being transmitted to the rim. This is completely contrary to the Campagnolo design discussed above. In terms of distributing static and dynamic tensile stresses between the distal and proximal spokes, the instant invention offers substantial advantages over the Campagnolo design. Although it has not been done, this design can be tested according to the auditory tension test described above in connection with the embodiment described with reference to FIG. 3. It is believed that such a test would also demonstrate a distribution of driving torque primarily through the distal spokes so that the application of driving torque lessens rather than increases the tension differential that exists between the distal and proximal spokes.

Figure 5:
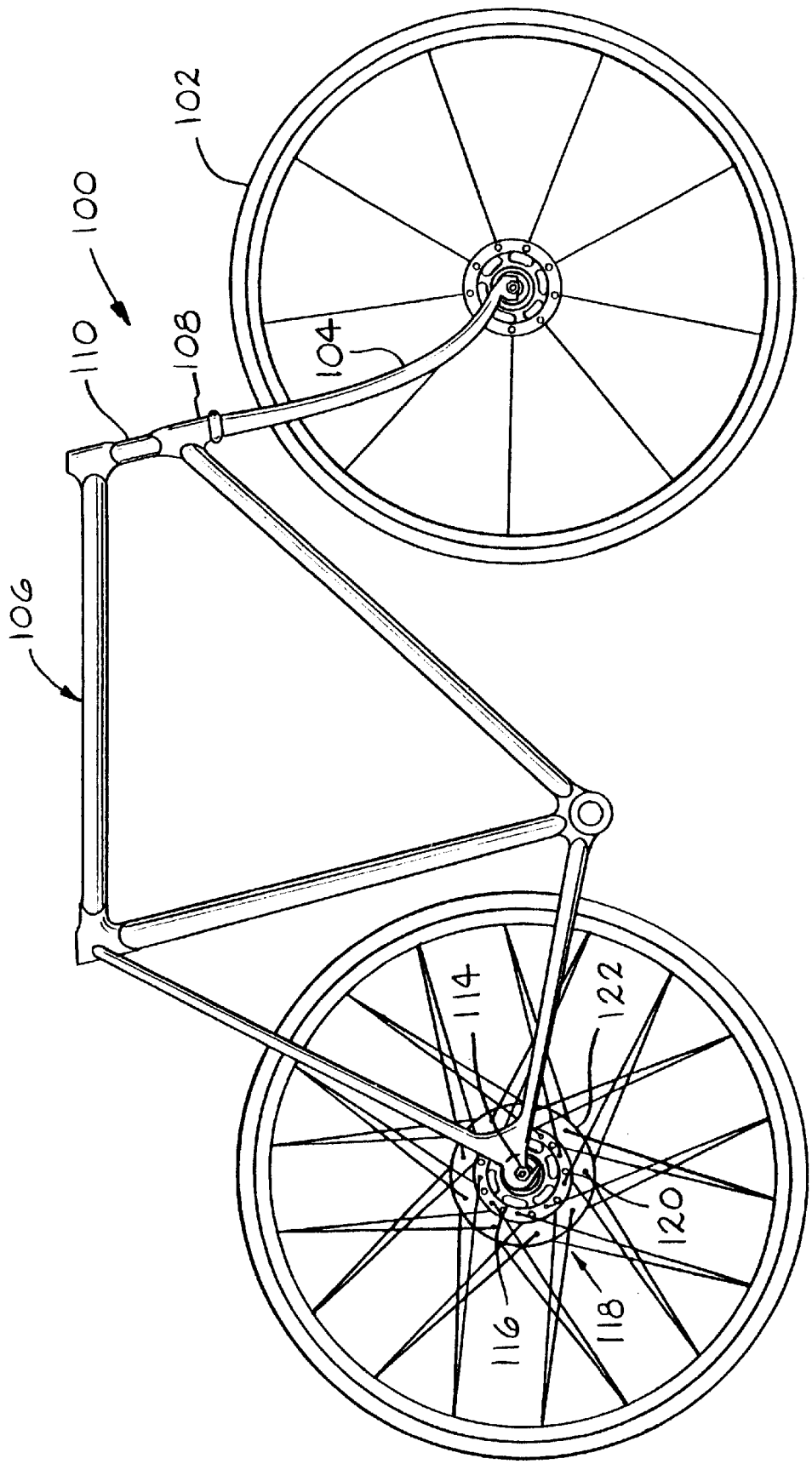
FIG. 5 is a side view of a bicycle including a rear wheel according to the present invention.

Referring now to FIG. 5, a bicycle according to the present invention is indicated generally at 100. The bicycle 100 comprises a front wheel 102, which can be of any design, mounted on a fork 104 which is connected to a frame 106 through a fork crown 108 which, in turn, is supported in a head tube 110 on the frame 106. A rear wheel 112, corresponding with either of the wheels 10 and 40 is mounted for rotation about an axle 114 which is supported in dropouts 116. The wheel 112 includes a multi-sprocket hub 118 having a small diameter proximal hub flange 120 and a large diameter distal hub fange 122.

Figure 6:
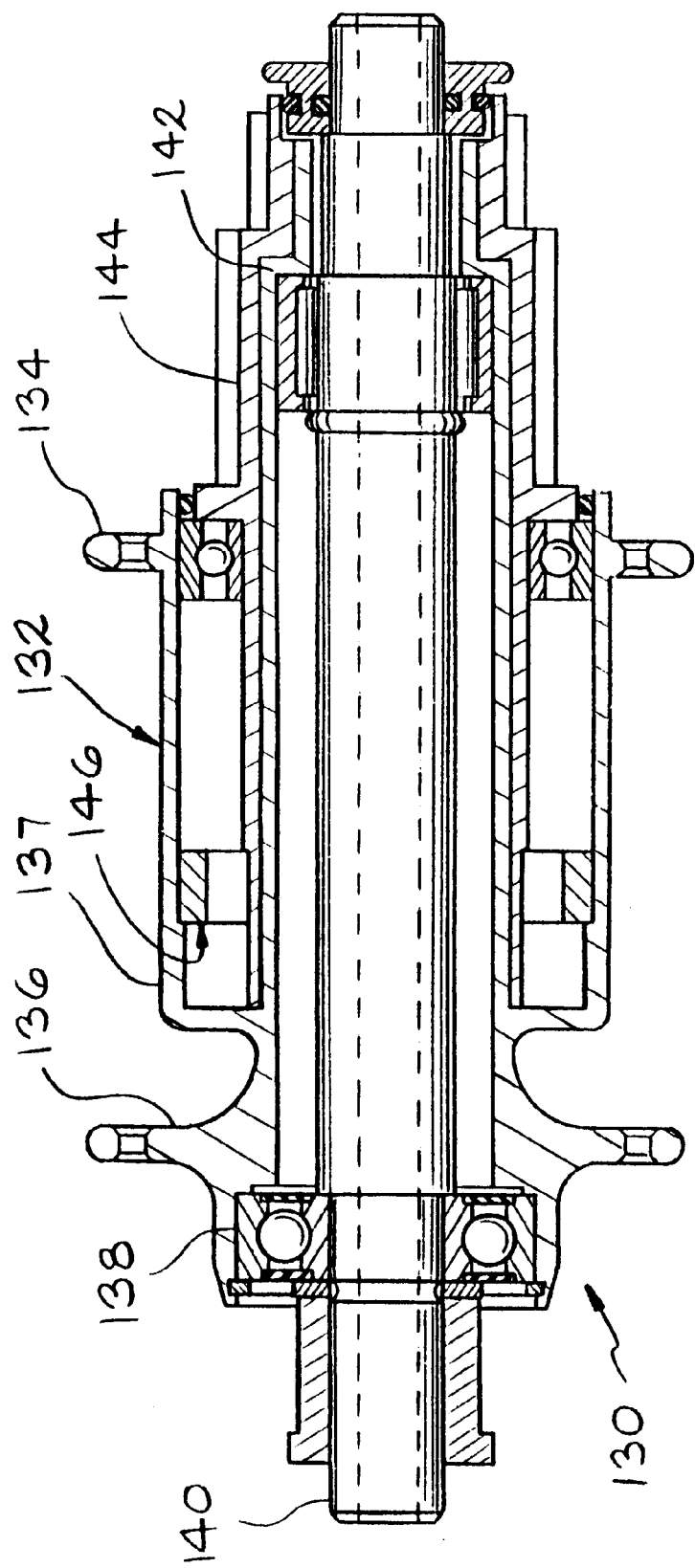
FIG. 6 is cross sectional view of a rear wheel hub which transmits torque to the hub adjacent to the distal hub flange.

Referring now to FIG. 6, a rear bicycle wheel hub according to the present invention is indicated generally at 130. The hub 130 corresponds generally with the hubs disclosed in U.S. Pat. No. 5,324,100, the disclosure of which is incorporated herein by reference. Although this embodiment of a hub according to the invention will be described in the context of the hub 130, it will be appreciated that the invention can be applied to other types of rear bicycle wheel hubs.

The hub 130 comprises an exterior hub body part 132 which includes a proximal hub flange 134 and a distal hub flange 136. The hub body part 132 includes a hub shaft 137 which is the portion of the body part 132 between the proximal hub flange 134 and the distal hub flange 136. The hub body part 132 is supported by a bearing 138 for rotation about an axle 140. The hub body part 132 further comprises a sprocket carrier support 142 on which a splined sprocket carrier 144 is supported. There is a cylindrical plain bearing between the sprocket carrier support 142 and the sprocket carrier 144, as described in said U.S. Pat. No. 5,324,100.

Contrary to the teachings of the patent, however, the hub 130 includes a free wheel mechanism, indicated generally at 146, positioned to transmit torque from the sprocket carrier 144 to the hub shaft 137 at a point between the proximal hub flange 134 and the distal hub flange 136. Specifically, the free wheel mechanism 146 is positioned closer to the distal hub flange 136 than to the proximal hub flange 134. The free wheel mechanism may be a Torrington roller clutch type bearing or a ratchet and pawl mechanism or the like. The key here is the positioning of the mechanism 146 closer to the distal hub flange 136 than to the proximal hub flange 134 so that more driving torque will be transmitted to the rim (not shown) from the distal hub flange 136 than from the proximal hub flange 134. As a consequence, even with like sized proximal and distal hub flanges 134 and 136, most of the driving torque will be transmitted through the distal spokes (not shown) rather than through the proximal spokes which, as mentioned above, have higher tension under static conditions than the distal spokes. Although it has not been done, this hub design can be tested according to the auditory tension test described above in connection with the embodiment described with reference to FIG. 3. It is believed that such a test would also demonstrate a distribution of driving torque primarily through the distal spokes so that the application of driving torque lessens rather than increases the tension differential that exists between the distal and proximal spokes.

It will be appreciated that the invention, described above with reference to specific embodiments, is susceptible of being adapted to other constructions of wheels and hubs. The foregoing description is intended to enable one skilled in the art to practice the invention and to make such adaptations, without limiting the scope of the invention. In one embodiment, the invention is a torque transmitting wheel comprising a hub, a rim, and a plurality of tensioned spoke members connecting the rim to the hub. The hub comprises a first, proximal hub flange, and a second, distal hub flange, the hub flanges being axially displaced from one another. The distance from the proximal hub flange to a plane through the proximal edge of the rim is substantially less than the distance for the distal hub flange to a plane through the distal edge of the rim. The wheel also includes at least one torque transmitting member, which can be a sprocket, a sprocket cluster, or a disc for a brake, mounted on the hub, adjacent to the proximal hub flange.

Figure 7:
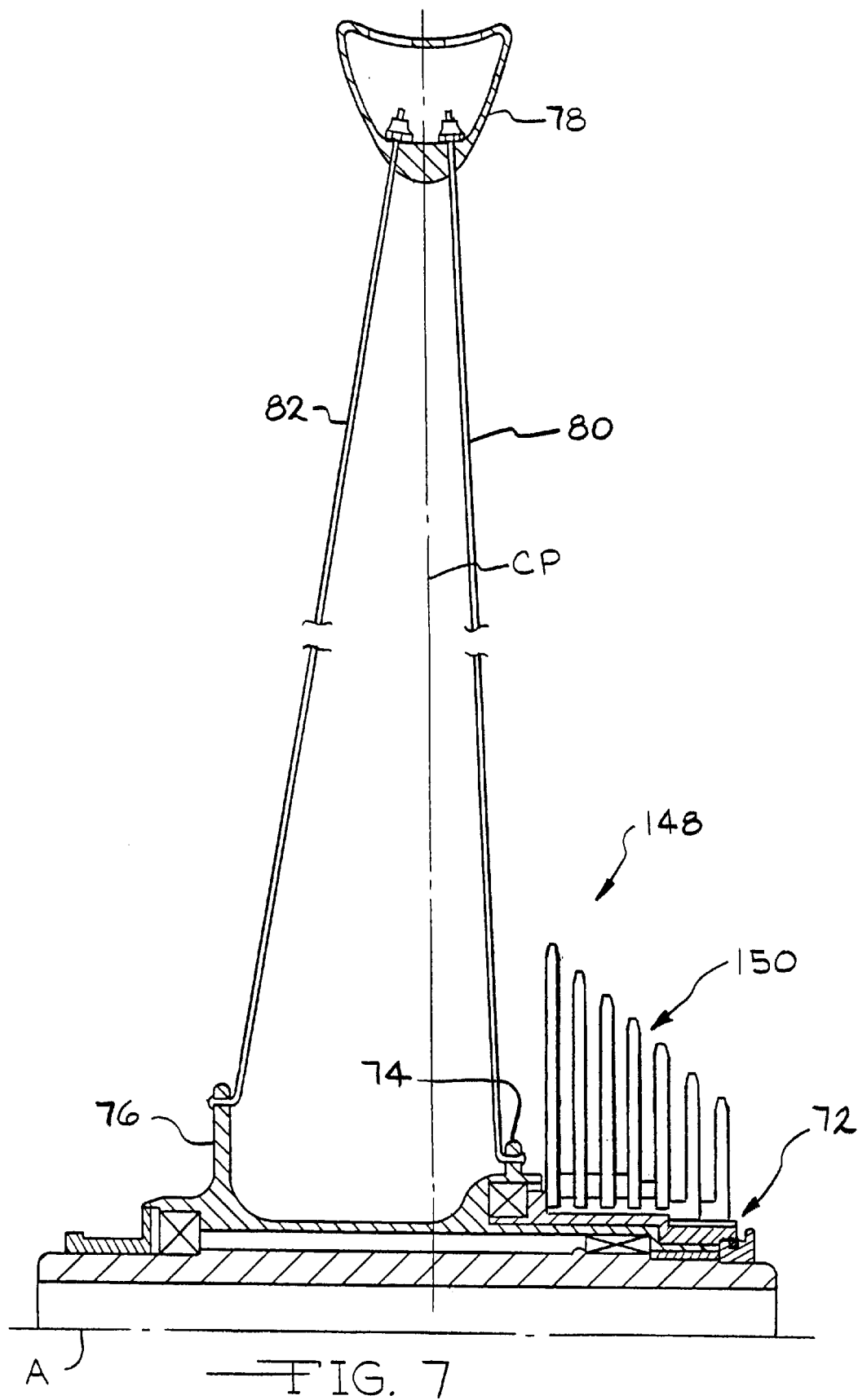
FIG. 7 is a cross sectional view of a wheel which is similar to that shown in FIG. 4, and which additionally includes a sprocket cluster mounted on the hub, adjacent to the proximal hub flange.

Referring to FIG. 7, another torque transmitting wheel according to the present invention is indicated generally at 148. Except that a sprocket cluster 150 has been added, the wheel 148 is identical to the wheel 70 of FIG. 4, comprising the hub 72, the proximal hub flange 74, the distal hub flange 76, and the rim 78. The rim 78 is laced to the hub 72 with eighteen pairs of proximal spokes 80 and distal spokes 82. The proximal spokes 80 are oriented radially so that they are virtually ineffective to transmit torque to the rim 78. The distal spokes 82 are oriented tangentially so that half of the distal spokes are operable to transmit torque to the rim. As noted above, under static conditions, the distal spokes are not as tight as the proximal spokes and the proximal spokes are significantly tighter than the distal spokes. By preventing the proximal spokes from transmitting torque and enduring the additional tensile stresses associated with torque transmission, the lacing pattern of this embodiment forces the distal spokes to carry the additional tensile stresses which arise when torque is being transmitted to the rim.

Figure 8:
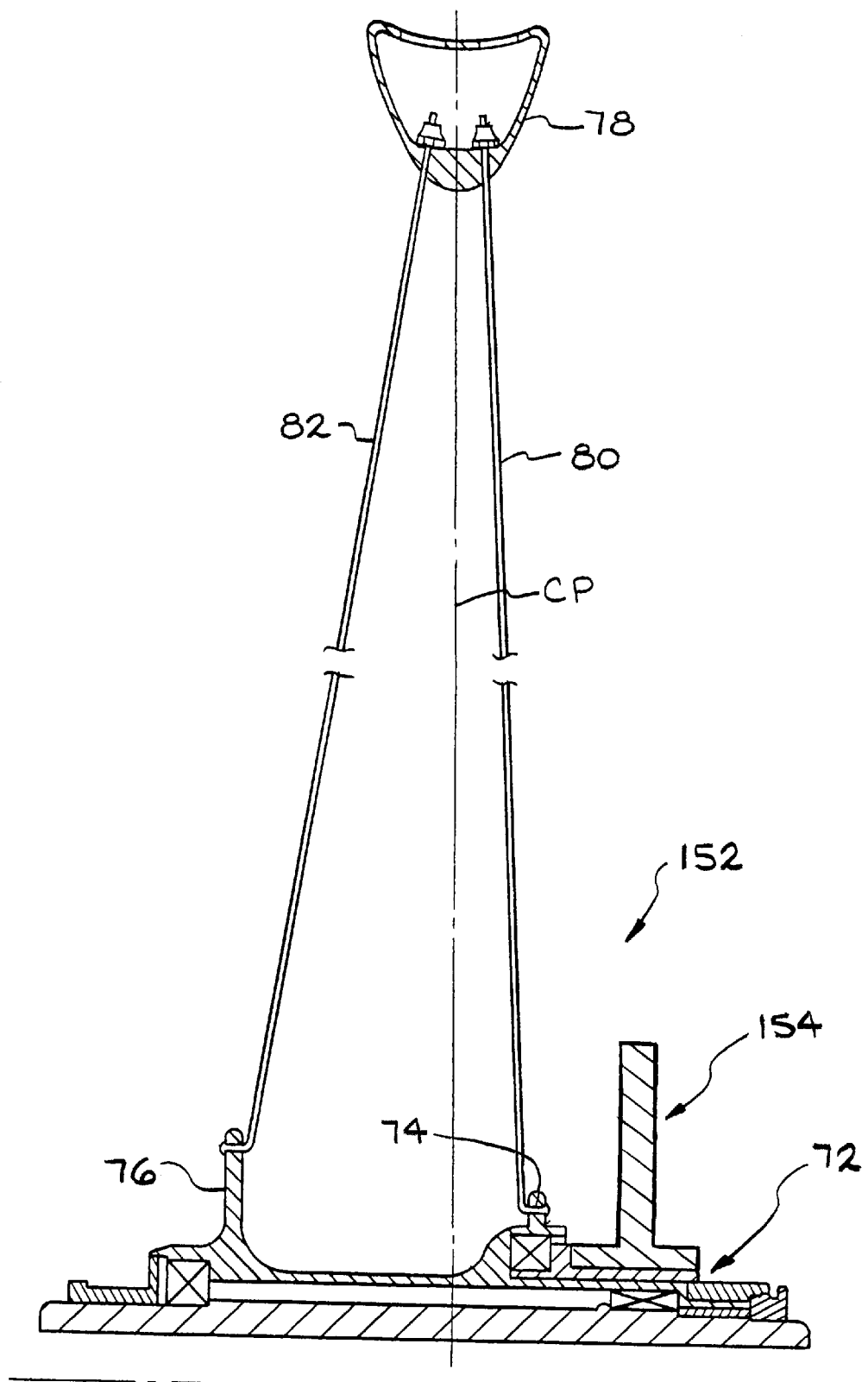
FIG. 8 is a view in section of a wheel which is similar to that shown in FIG. 4, and which additionally includes a disc for a brake mounted on the hub, adjacent to the proximal hub flange.

Referring to FIG. 8, still another torque transmitting wheel according to the present invention is indicated generally at 152. Except that a disc 154 for a brake has been added, the wheel 152 is identical to the wheel 70 of FIG. 4, comprising the hub 72, the proximal hub flange 74 the distal hub flange 76, and the rim 78. The rim 78 is laced to the hub 72 with eighteen pairs of proximal spokes 80 and distal spokes 82. The proximal spokes 80 are oriented radially so that they are virtually ineffective to transmit torque to the rim 78. The distal spokes 82 are oriented tangentially so that half of the distal spokes are operable to transmit torque to the rim. As noted above, under static conditions, the distal spokes are not as tight as the proximal spokes and the proximal spokes are significantly tighter than the distal spokes. By preventing the proximal spokes from transmitting torque and enduring the additional tensile stresses associated with torque transmission, the lacing pattern of this embodiment forces the distal spokes to carry the additional tensile stresses which arise when torque is being transmitted to the rim.

The torque transmitting member, when it is a sprocket or a sprocket cluster, is mounted on the hub so that when the torque transmitting member is rotated in a first direction, that rotation is always transmitted to the hub. A plurality of the spoke members are radially oriented and connect the rim to the proximal hub flange while a second plurality of the spoke members are tangentially oriented and connect the rim to the distal hub flange. As a consequence, torque applied to the torque transmitting member is transmitted to the rim primarily through the plurality of tensioned spoke members connecting the rim to the distal hub flange. If the hub distorts sufficiently when a torque is applied to the torque transmitting member, some of the radially oriented spoke members connecting the rim to the proximal hub flange can become tangential while the hub is distorted and, as a consequence, torque can be transmitted from the proximal flange to the rim so long as the hub is distorted sufficiently.

I claim:

1. A rear bicycle wheel having a center plane, said wheel comprising a rim, a hub comprising a first, proximal hub flange, a second, distal hub flange, said first and second hub flanges being axially displaced from one another, each on the opposite side of the wheel center plane from the other, at least one sprocket mounted on said hub, adjacent to said proximal hub flange, wherein said proximal hub flange is substantially closer to the center plane than said distal hub flange, a plurality of tensioned, radially oriented spoke members connecting said rim to said proximal hub flange and a plurality of tensioned, tangentially oriented spoke members connecting said rim to said distal hub flange whereby torque applied to said at least one sprocket is transmitted primarily through said plurality of tensioned spoke members connecting said rim to said distal hub flange.

2. A torque transmitting wheel comprising a hub comprising a first, proximal hub flange, a second, distal hub flange, said hub flanges being axially displaced from one another, at least one torque transmitting member mounted on said hub, adjacent to said proximal hub flange, wherein the distance from said proximal hub flange to a plane through a proximal edge of said rim is less than the distance from said distal hub flange to a plane through a distal edge of said rim, and wherein said torque transmitting member is mounted on said hub so that, when torque is applied in at least one direction to said torque transmitting member, that torque is transmitted to said hub a rim, a first plurality of tensioned spoke members connecting said rim to said proximal hub flange, and a second plurality of spoke members connecting said rim to said distal hub flange, wherein said first plurality of tensioned spoke members are oriented radially and at least some of said second plurality of spoke members are oriented tangentially, to the extent that torque applied to said torque transmitting member is transmitted to said rim primarily through said second plurality of tensioned spoke members connecting said rim to said distal hub flange.

3. The wheel claimed in claim 2 wherein said torque transmitting member comprises at least one sprocket.

4. The wheel claimed in claim 2 wherein said torque transmitting member comprises a sprocket cluster.

5. The wheel claimed in claim 2 wherein said torque transmitting member comprises a brake disk.

6. A torque transmitting wheel comprising a hub comprising a first, proximal hub flange, a second, distal hub flange, said hub flanges being axially displaced from one another, at least one torque transmitting member mounted on said hub, adjacent to said proximal hub flange, wherein said torque transmitting member is mounted on said hub so that, when torque is applied in at least one direction to said torque transmitting member, that torque is transmitted to said hub a rim, a first plurality of tensioned spoke members connecting said rim to said proximal hub flange, and a second plurality of spoke members connecting said rim to said distal hub flange, wherein, under static conditions, said first plurality of spokes are at a given tension and said second plurality of spokes are at a second tension which is lower than said given tension so that there is a tension differential, under static conditions, between said first plurality of spokes and said second plurality of spokes, and wherein said first plurality of tensioned spoke members are oriented radially and at least some of said second plurality of spoke members are oriented tangentially, to the extent that, when torque is being applied to said torque transmitting member and that torque is being transmitted to said rim, the tension differential between said first plurality of spokes and said second plurality of spokes is reduced by comparison with the tension differential therebetween under static conditions.

7. The wheel claimed in claim 6 wherein said torque transmitting member comprises at least one sprocket.

8. The wheel claimed in claim 6 wherein said torque transmitting member comprises a sprocket cluster.

9. The wheel claimed in claim 6 wherein said torque transmitting member comprises a brake disk.

* * * * *